United States Patent
Ito et al.

(10) Patent No.: US 11,180,015 B2
(45) Date of Patent: Nov. 23, 2021

(54) TORQUE ROD

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 70 days.

(21) Appl. No.: 16/790,181

(22) Filed: Feb. 13, 2020

(65) Prior Publication Data

US 2020/0262286 A1 Aug. 20, 2020

(30) Foreign Application Priority Data

Feb. 15, 2019 (JP) .............................. JP2019025087

(51) Int. Cl.
| | | |
|---|---|---|
| *B60K 5/12* | (2006.01) | |
| *F16F 15/03* | (2006.01) | |
| *F16F 15/02* | (2006.01) | |
| *F16F 1/36* | (2006.01) | |

(52) U.S. Cl.
CPC .......... *B60K 5/1208* (2013.01); *F16F 1/3605* (2013.01); *F16F 15/03* (2013.01); *F16F 1/3615* (2013.01); *F16F 2224/025* (2013.01)

(58) Field of Classification Search
CPC ...... B60K 5/1208; F16F 1/3605; F16F 15/03; F16F 1/3615; F16F 2224/025
See application file for complete search history.

(56) References Cited

U.S. PATENT DOCUMENTS

| | | | | |
|---|---|---|---|---|
| 4,610,420 A | * | 9/1986 | Fukushima ........... | F16F 13/262 180/300 |
| 5,718,418 A | * | 2/1998 | Gugsch ................. | F16F 7/1011 188/267 |
| 6,406,010 B1 | * | 6/2002 | Yano ..................... | F16F 13/106 267/140.13 |

(Continued)

FOREIGN PATENT DOCUMENTS

| | | |
|---|---|---|
| CN | 101324257 A | 12/2008 |
| JP | 2013217400 A | 10/2013 |

(Continued)

OTHER PUBLICATIONS

First Notification of Office Action for Patent Application CN 202010095091.7 dated Jun. 21, 2021; 16 pp.

*Primary Examiner* — Robert A. Siconolfi
*Assistant Examiner* — James K Hsiao
(74) *Attorney, Agent, or Firm* — Armstrong Teasdale LLP

(57) ABSTRACT

Provided is a torque rod (1, 101, 202, 301) configured to be connected between a vehicle body (2) and an engine (3) to restrict a movement of the engine relative to the vehicle body. The torque rod includes a rod main body (11, 211, 307), and a bushing assembly provided at one end (14) of the rod main body. The bushing assembly includes a mounting bracket (21, 203, 303) configured to be mounted to the vehicle body or the engine via a bolt (22) passed therethrough in an axial direction, a magneto-elastic member (31, 204, 322) made of magneto-elastic material axially interposed between the one end of the rod main body and the mounting bracket, and a coil (32, 205, 323) configured to apply a magnetic flux to the magneto-elastic member.

8 Claims, 8 Drawing Sheets

(56) References Cited

U.S. PATENT DOCUMENTS

| | | | |
|---|---|---|---|
| 9,103,403 B2* | 8/2015 | Hadden | F16F 15/06 |
| 9,212,716 B2* | 12/2015 | Yoon | B60K 5/1241 |
| 9,815,361 B2* | 11/2017 | Patel | F16F 1/3821 |
| 10,464,407 B2* | 11/2019 | Han | B60K 5/1241 |
| 2004/0017033 A1* | 1/2004 | Ichikawa | F16F 7/108 |
| | | | 267/140.14 |
| 2005/0254888 A1* | 11/2005 | Oji | F16F 1/3849 |
| | | | 403/187 |
| 2009/0039577 A1* | 2/2009 | Ishiguro | F16F 15/02 |
| | | | 267/140.13 |
| 2009/0079114 A1* | 3/2009 | Muraoka | F16F 13/26 |
| | | | 267/121 |
| 2010/0038195 A1* | 2/2010 | Kojima | F16F 13/305 |
| | | | 188/267.1 |
| 2012/0098177 A1* | 4/2012 | Satou | F16F 7/1011 |
| | | | 267/140.14 |
| 2013/0328254 A1* | 12/2013 | Kojima | F16F 7/1011 |
| | | | 267/140.15 |
| 2014/0124645 A1* | 5/2014 | Satou | F16F 15/02 |
| | | | 248/638 |
| 2015/0001773 A1* | 1/2015 | Inoue | F16F 15/022 |
| | | | 267/140.15 |
| 2015/0204405 A1* | 7/2015 | Shimada | F16F 1/38 |
| | | | 267/141.2 |
| 2015/0204406 A1* | 7/2015 | Yoon | F16F 6/005 |
| | | | 248/562 |
| 2016/0333957 A1* | 11/2016 | Inoue | B60K 5/1208 |
| 2017/0217275 A1* | 8/2017 | DeBruler | B60G 17/0155 |
| 2017/0219039 A1* | 8/2017 | Inoue | F16F 7/1011 |
| 2017/0331357 A1* | 11/2017 | Terashima | F16F 1/3615 |
| 2017/0363171 A1* | 12/2017 | Inoue | F16F 15/31 |
| 2018/0066723 A1* | 3/2018 | Inoue | F16F 15/03 |
| 2018/0371988 A1* | 12/2018 | Melde-Tuczai | F16C 7/06 |
| 2019/0154098 A1* | 5/2019 | Inoue | F16F 1/361 |
| 2019/0170206 A1* | 6/2019 | Inoue | B62D 27/04 |

FOREIGN PATENT DOCUMENTS

| | | |
|---|---|---|
| JP | 2015121254 A | 7/2015 |
| JP | 2016016764 A | 2/2016 |
| JP | 2016044717 A | 4/2016 |

* cited by examiner

TORQUE ROD

TECHNICAL FIELD

The present invention relates to a torque rod that is configured to be connected between a vehicle body and an engine to restrict the movement of the engine relative to the vehicle body.

BACKGROUND ART

In modern vehicles typically fitted with a transversely mounted engine, it is a common practice to support the engine with a pair of engine mounts and a torque rod. More specifically, the two engine mounts supporting a large part of the downward loading of the engine are positioned on the principal axis of inertia, and the rolling movement of the engine around the roll axis (the principal axis of inertia) caused primarily by the drive torque of the engine is restricted by the torque rod. This engine support structure is simple in structure and light in weight so that the fuel economy of the vehicle can be improved.

The torque rod transmits vibrations of the engine to the vehicle body, and this may cause an increase in noises and vibrations in the passenger compartment. Therefore, it is desired to prevent noises and vibrations to be transmitted by the torque rod. As a technology aimed at reducing the vibrations and noises transmitted by the torque rod, it has been proposed to provide a dynamic damper on the torque rod so that the vibrations transmitted from the engine to the vehicle body via the torque rod may be reduced. See JP2016-044717A, JP2016-016764A, and JP2015-121254A, for instance.

The torque rod is thus required to provide favorable noise and vibration properties, but it is also important to consider the influences of the stiffness of the torque rod on the handling and the driving stability of the vehicle. If the stiffness of the torque rod is high, the movement of the engine is effectively restricted so that the vehicle handling (the driving stability) can be improved. However, the noise and vibration performance may be impaired. If the stiffness of the torque rod is low, the transmission of vibrations from the engine to the vehicle body via the torque rod can be reduced so that the noise and vibration performance of the torque rod can be improved. However, the handling of the vehicle may be impaired.

Thus, the torque rod has mutually conflicting requirements, and there has been a desire to optimize the performance of the torque rod in both the noise and vibration performance and the vehicle handling.

The previous proposals mentioned above are essentially directed to reducing the vibrations transmitted by the torque rod by using dynamic dampers and other means, and are not adapted to improving the handling of the vehicle.

SUMMARY OF THE INVENTION

In view of such a problem of the prior art, a primary object of the present invention is to provide a torque rod having a stiffness that is variable depending on the operating condition of the vehicle so that the vehicle handling and the vibration and noise property can be optimized at the same time.

To achieve such an object, one embodiment of the present invention provides a torque rod (1, 101, 202, 301) configured to be connected between a vehicle body (2) and an engine (3) to restrict a movement of the engine relative to the vehicle body, comprising: a rod main body (11, 211, 307); and a bushing assembly (17, 217, 317) provided at one end (14) of the rod main body; wherein the bushing assembly includes a mounting bracket (21, 203, 303) configured to be mounted to the vehicle body or the engine via a bolt (22) passed therethrough in an axial direction, a magneto-elastic member (31, 204, 322) made of magneto-elastic material axially interposed between the one end of the rod main body and the mounting bracket, and a coil (32, 205, 323) configured to apply a magnetic flux to the magneto-elastic member.

Thereby, the stiffness of the torque rod can be controlled according to the operating condition of the vehicle by adjusting the electric current supplied to the coil. Thus, when vehicle handling (driving stability, etc.) is desired to be improved, the stiffness of the torque rod is increased. On the other hand, when the vibrations transmitted from the engine to the vehicle body via the torque rod are desired to be reduced, the stiffness of the torque rod is decreased. Thereby, the vehicle handling and vibration noise performance can both be improved at the same time.

Preferably, the mounting bracket includes an inner tubular member (25, 206, 331) having the bolt passed axially therethrough, and a pair of flanges (26, 207, 332) provided at either axial end of the inner tubular member, and the one end of the rod main body is provided with an outer annular portion (16, 212, 308) having the bolt passed axially therethrough, the magneto-elastic member being axially interposed between the outer annular portion and the flanges. Particularly preferably, the inner tubular member, the flanges and the outer annular portion are made of high magnetic permeability material, and the coil is wound around the inner tubular member.

The magnetic flux generated from the coil is conducted by the inner tubular member and the flanges of the mounting bracket so that the magnetic flux generated from the coil can be efficiently passed through the magneto-elastic member.

Preferably, the magneto-elastic member has a hollow cylindrical shape and is configured to change an elastic property with respect to a shear deformation thereof in a transverse direction in dependence on a magnetic flux passing axially through the magneto-elastic member.

Thereby, the stiffness of the torque rod can be efficiently controlled by the favorable elastic shear deformation characteristics of the magneto-elastic material.

Preferably, the magneto-elastic member includes a plurality of layers of the magneto-elastic material, and annular disks (33) made of high magnetic permeability material interleaved between the layers of the magneto-elastic material. In particular, the magneto-elastic material may be essentially made of magneto-elastic elastomer.

By thus forming the magneto-elastic member by interleaving the magneto-elastic material with the annular disks made of high magnetic permeability material, the magneto-elastic member is allowed to undergo the shear deformation in a stable manner, and the attenuation of the magnetic flux passing through the magneto-elastic member can be minimized.

Preferably, the torque rod further comprises a constant elastic modulus member (102) radially interposed between the outer annular portion and the inner tubular member, or between the outer annular portion and the coil.

By thus combining the magneto-elastic member and the constant elastic modulus member, the stiffness of the torque rod can be controlled in an optimal fashion.

Preferably, the torque rod further comprises a pair of constant elastic modulus members (231) axially interposed between the outer annular portion (206) and the respective flanges (207) of the mounting bracket (202), and arranged on either side of a lengthwise axial center line of the rod main body (211), and the magneto-elastic member comprises a pair of magneto-elastic members (204) positioned along the lengthwise axial center line of the rod main body so as to circumferentially alternate with the constant elastic modulus members.

By thus combining the magneto-elastic member and the constant elastic modulus member, the stiffness of the torque rod can be controlled in a particularly optimal fashion.

Preferably, the torque rod further comprises a constant elastic modulus member (304) radially interposed between the outer annular portion and the inner tubular member, and the magneto-elastic member includes a pair of magneto-elastic members (322) each interposed between a corresponding one of an axial end surface of the outer annular portion and an opposing axial end surface of the corresponding flange of the mounting bracket.

By thus combining the magneto-elastic member and the constant elastic modulus member, the stiffness of the torque rod can be controlled in a particularly optimal fashion.

The present invention thus provides a torque rod having a stiffness that is variable depending on the operating condition of the vehicle so that the vehicle handling and the vibration and noise property can be optimized at the same time.

BRIEF DESCRIPTION OF THE DRAWING(S)

DESCRIPTION OF THE PREFERRED EMBODIMENT(S)

Preferred embodiments of the present invention are described in the following with reference to the appended drawings.

First Embodiment

Figure 1:
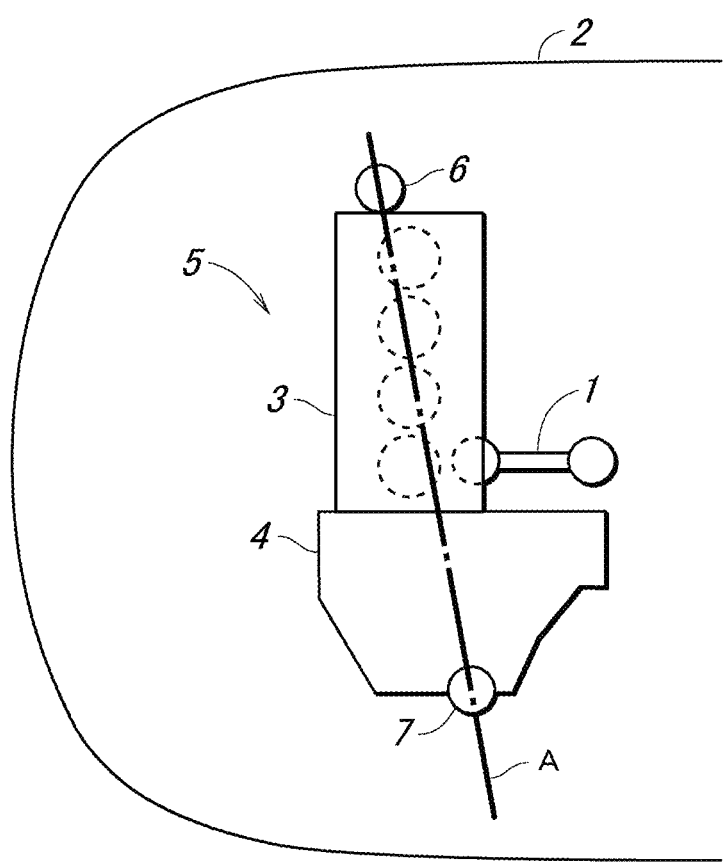
FIG. 1 is a plan view showing a mounting state of a torque rod according to a first embodiment of the present invention.
Figure 2:
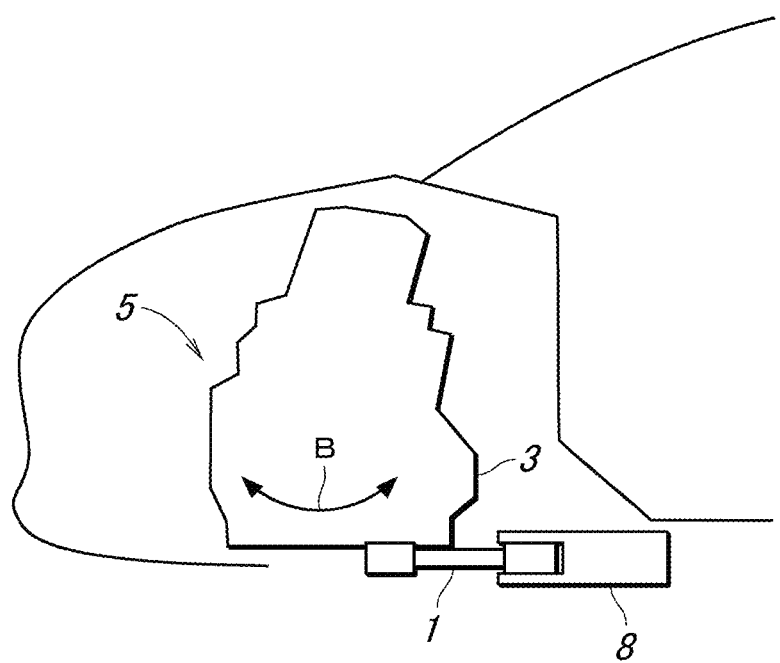
FIG. 2 is a side view showing the mounting state of the torque rod.

FIG. 1 is a plan view showing a mounting state of a torque rod 1 according to a first embodiment of the present invention, and FIG. 2 is a side view showing the mounting state of the torque rod 1.

As shown in FIG. 1, an engine 3 is mounted transversely in a front part of a vehicle body 2 of a vehicle, and a transmission 4 is provided integrally with the engine 3. The engine 3 and the transmission 4 jointly form a power plant 5 of the vehicle. The power plant 5 is supported by the vehicle body 2 via two engine mounts 6 and 7 (side mount and transmission mount) and a torque rod 1.

The two engine mounts 6 and 7 support the main load (the weight) of the power plant 5 and are arranged on the principal axis of inertia A of the power plant 5. In addition, as shown in FIG. 2, a torque rod 1 is connected to the engine 3 at one end thereof, and to a subframe 8 (the vehicle body 2) at the other end thereof. The torque rod 1 restricts the roll motion B of the power plant 5 around the roll axis or the principal axis of inertia A of the power plant 5 which is caused by the output torque of the engine 3.

Figure 3:
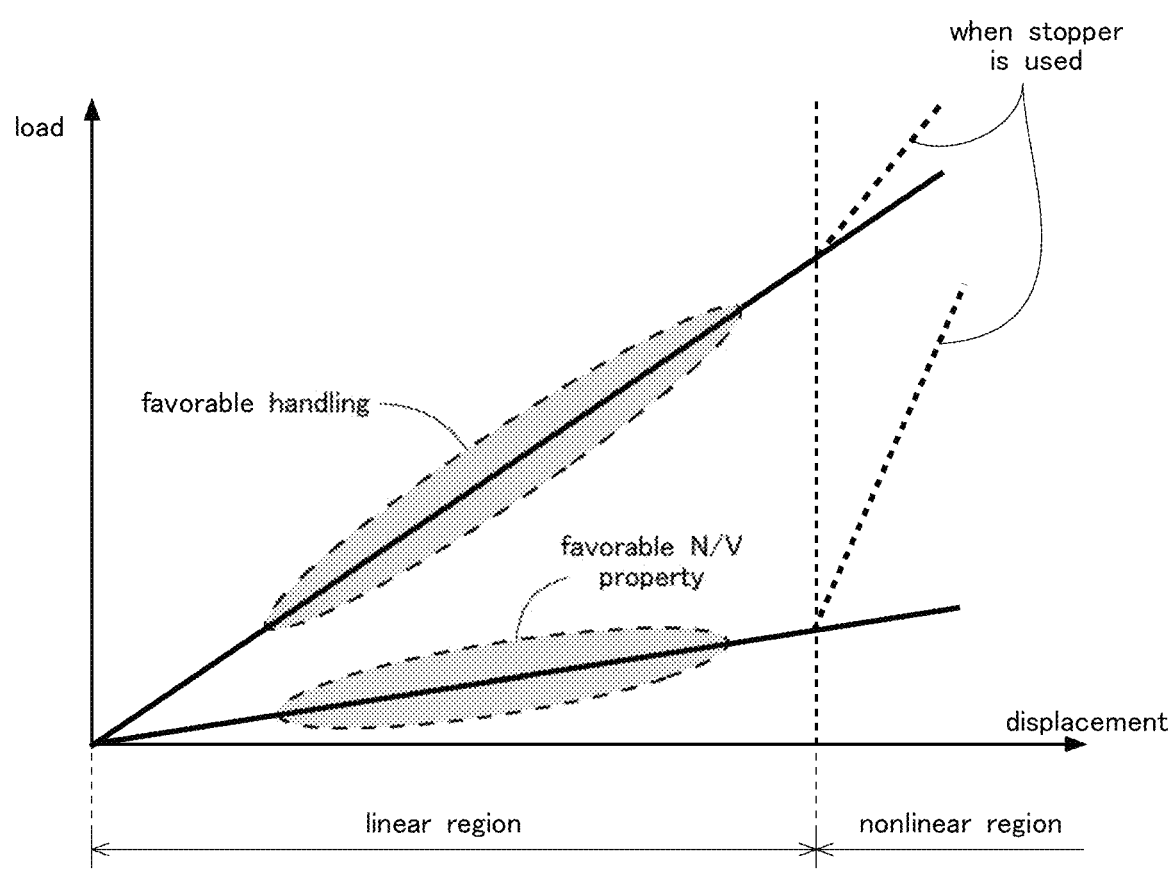
FIG. 3 is a graph showing the desired relationships between the displacement and the load of a bushing of the torque rod.

The properties that are required of the torque rod 1 are discussed in the following. FIG. 3 shows the desired relationships between the displacement and the load of a bushing of the torque rod 1. The abscissa of the graph represents the displacement (roll motion) of the engine 3 which is elastically supported by the torque rod 1, and the ordinate represents the load acting on the torque rod 1 in the axial direction.

In the engine support structure shown in FIG. 1, when driving torque (static torque) is generated by the engine 3 during acceleration or deceleration, the engine 3 swings or undergoes a roll motion around the roll axis (principal axis of inertia A) owing to this driving torque. When the driving torque increases, the displacement of the engine 3 increases, possibly causing interference with the vehicle body 2 or auxiliary equipment so that the durability of the engine may be reduced. In addition, when steering the vehicle, vibrations around the roll axis (principal axis of inertia A) are generated in the engine 3 due to the vibrations input from the road surface or vibrations caused by the inertial force of the engine 3 so that the handling characteristics of the vehicle may be impaired.

Meanwhile, when the engine 3 is idling or rotating at a low speed, torque fluctuations (dynamic torque) due to combustion fluctuations of the engine 3 are generated, and this in turn causes the vibration of the engine 3 around the roll axis (principal axis of inertia A) to be generated. This vibration is transmitted from the engine 3 to the vehicle body 2 via the torque rod 1, thereby generating vibration and noise in the cabin of the vehicle.

Here, if the stiffness of the torque rod 1 is high, the rolling motion of the engine 3 can be suppressed so that the torque response of the engine 3 can be improved, and the vehicle handling (the driving stability, etc.) of the vehicle can be improved. On the other hand, since the vibration transmitted from the engine 3 to the vehicle body 2 via the torque rod 1 cannot be sufficiently suppressed, the vibration and noise performance of the vehicle may be impaired.

If the stiffness of the torque rod 1 is low, the vibration transmitted from the engine 3 to the vehicle body 2 via the torque rod 1 can be effectively suppressed so that the vibration and noise performance of the vehicle can be improved. However, the torque response of the engine 3 can be impaired, and the roll motion of the engine 3 cannot be sufficiently suppressed so the handling of the vehicle may be impaired. Thus, there are conflicting requirements in improving the vibration and noise performance and the handling of the vehicle at the same time.

According to the present invention, to overcome this problem, the torque rod 1 is configured such that the stiffness of the torque rod 1, in particular the stiffness of the bushing assembly thereof, can be controlled in dependence on the driving condition of the vehicle. Thereby, the vibration and noise performance and the handling of the vehicle can be improved.

The torque rod 1 may be provided with a stopper that elastically restricts the displacement of the engine 3 relative to the vehicle body 2 when the displacement of the engine 3 is greater than a prescribed value. In this case, it may be arranged such that a low stiffness elastic member contributes to the stiffness of the torque rod 1 when the displacement is small (linear spring region), and a high stiffness elastic member (typically jointly with the low stiffness elastic member) contributes to the stiffness of the torque rod 1 when the displacement is large (displacement restricting region).

Figure 4:
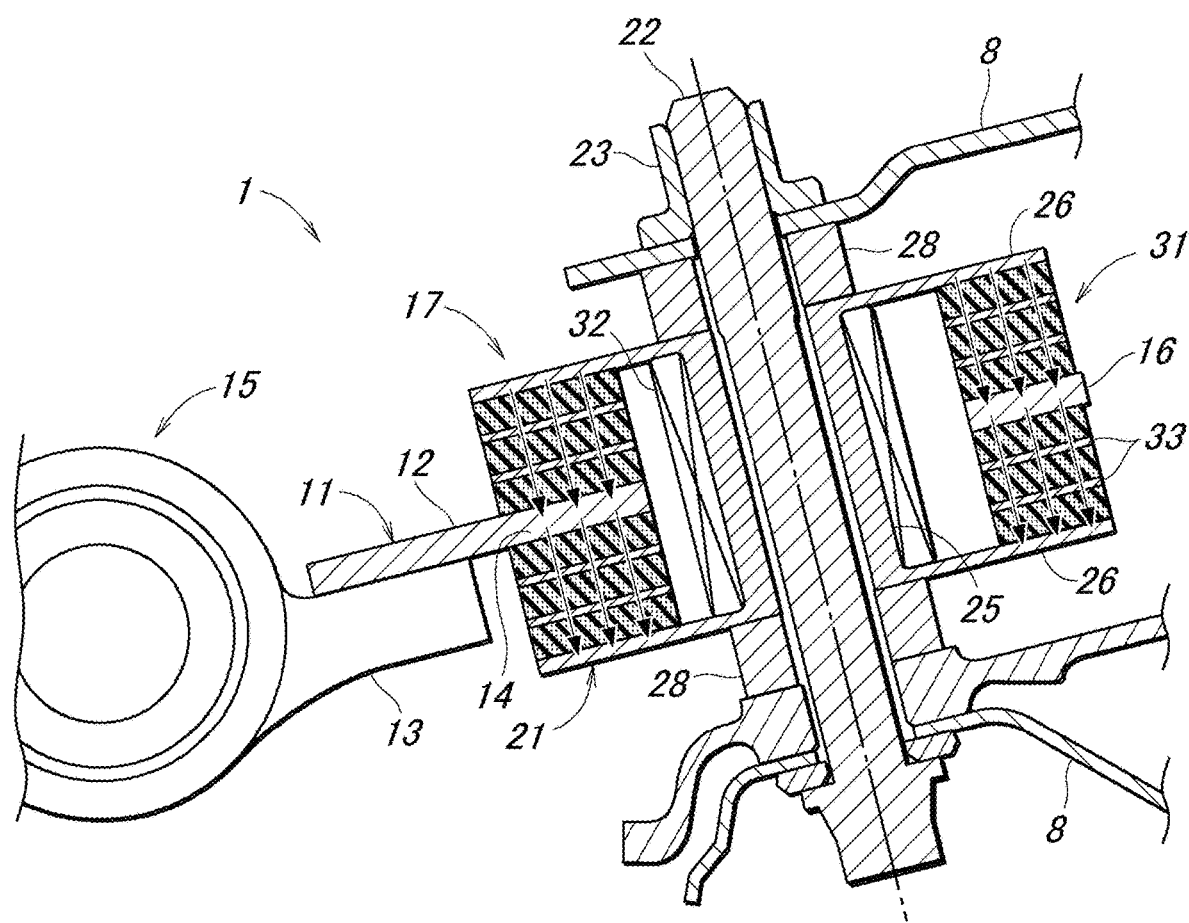
FIG. 4 is a sectional view of the torque rod.

FIG. 4 is a cross sectional view of the torque rod 1 according to the first embodiment.

The torque rod 1 includes a rod main body 11 which in this embodiment consists of a vehicle body side rod body 12 and an engine side rod body 13. The vehicle body side rod body 12 is provided with a large diameter end portion 14 attached to a subframe 8 of the vehicle body. The engine side rod body 13 is provided with a small diameter end portion 15 attached to the engine 3. The rod main body 11 consists of the two pieces, but may also consist of a single piece member.

The vehicle body side rod body 12 is made of a magnetic material or a high magnetic permeability material such as an iron-based material. The large diameter end portion 14 of the vehicle body side rod body 12 is provided with an outer annular portion 16 defining a circular opening.

The large diameter end portion 14 is connected to the subframe 8 via a bushing assembly 17. The bushing assembly 17 includes a mounting bracket 21 consisting of an inner cylindrical portion 25 and a pair of flanges 26 extending radially outward from either axial end thereof. The large diameter end portion 14, in particular the outer annular portion 16 thereof, is disposed coaxially with the inner cylindrical portion 25, and is interposed between the two flanges 26 of the bushing assembly 17. A cylindrical magneto-elastic member 31 is interposed between the outer annular portion 16 and the flanges 26. More specifically, the magneto-elastic member 31 consists of two parts each axially interposed between the corresponding axial end surface of the outer annular portion 16 and the opposing end surface of the corresponding flange 26.

The bushing assembly 17 is placed between a pair of plate members of the subframe 8, and a bolt 22 is passed through openings in the subframe 8 and the inner bore of the inner cylindrical portion 25. A nut 23 is threaded onto the bolt 22 to fixedly secure the bushing assembly 17 between the plate members of the subframe 8.

The inner cylindrical portion 25 and the flanges 26 are made of a high magnetic permeability material such as iron-based material. A collar member 28 made of material having a low magnetic permeability such as aluminum is interposed between each axial end of the inner cylindrical portion 25 and the opposing plate member of the subframe 8. The bolt 22 is passed through the central openings of the collar members 28. A coil 32 is wound around the inner cylindrical portion 25.

The magneto-elastic member 31 is disposed coaxially with the inner cylindrical portion 25, and is axially interposed between the outer annular portion 16 of the vehicle body side rod body 12 and the flanges 26. In the illustrated embodiment, the magneto-elastic member 31 consists of a plurality (six, in the illustrated embodiment) of layers of magneto-elastic material that are stacked in the axial direction, and are interleaved by annular disks 33 which are made of high magnetic permeability material. In particular, in the illustrated embodiment, the three of the six layers of the magneto-elastic material are interposed between one of the axial end surfaces of the outer annular portion 16 and the opposing flange 26, and the remaining three layers of the magneto-elastic material are interposed between the other axial end surface of the outer annular portion 16 and the opposing flange 26.

Each layer of the magneto-elastic material of the magneto-elastic member 31 is made of a magneto-elastic elastomer (magnetic viscoelastic elastomer) which demonstrates an elastic modulus that varies depending on the intensity of the magnetic flux applied thereto. This magneto-elastic elastomer can be obtained by dispersing magnetic particles (for example, iron powder) in a base material made of a silicone-based elastomer. When subjected to a magnetic flux, the particles are aligned in the direction of the magnetic flux so that the stiffness of the magneto-elastic elastomer increases.

The coil 32 is provided on the outer periphery of the inner cylindrical portion 25 of the bushing assembly 17. The coil 32 is formed by winding a conductive wire around the inner cylindrical portion 25. For the convenience of assembly, at least one of the flanges 26 may consist of a separate member which is attached to the inner cylindrical portion 25 via a screw thread, welding or other means of attachment after the coil 32, the outer annular portion 16, and the magneto-elastic member 31 are assembled to the bushing assembly 17.

The annular disks 33 interposed between the layers of the magneto-elastic material are made of an iron-based material. A relatively large axial dimension is required for the magneto-elastic member 31 to provide a required elastic property such as a large displacement stroke, but this causes the intensity of the magnetic flux passing through the magneto-elastic member 31 to be reduced. Therefore, by forming the magneto-elastic member 31 by interleaving the layers of the magneto-elastic material with the annular disks 33, the intensity of the magnetic flux passing through the magneto-elastic member 31 is prevented from being reduced.

When an electric current is supplied from a control unit (not shown in the drawings) to the coil 32, the magnetic flux generated from the coil 32 passes through the magneto-elastic member 31, and the stiffness of the magneto-elastic member 31 increases. More specifically, the stiffness of the magneto-elastic member 31 is comparatively low when no current is passed through the coil 32, and the stiffness of the magneto-elastic member 31 is comparatively high when electric current is passed through the coil 32. In particular, the stiffness of the magneto-elastic member 31 progressively increases as the magnitude of the current conducted through the coil 32 increases. Thus, the stiffness of the magneto-elastic member 31 can be controlled by adjusting the electric current supplied to the coil 32.

In the present embodiment, since the vehicle body side rod body 12 and the mounting bracket 21 are made of a high magnetic permeability material (such as iron-based material), the magnetic flux generated from the coil 32 is efficiently guided to the magneto-elastic member 31, and the leakage of the magnetic flux can be minimized. In addition, since the collar members 28 provided between the subframe 8 and the mounting bracket 21 are formed of a material having a low magnetic permeability (for example, aluminum material), when the subframe 8 on the vehicle body side is made of iron, the magnetic flux generated from the coil 32 can be prevented from leaking to the subframe 8.

In the present embodiment, since the magneto-elastic member 31 is provided between the large diameter end portion 14 of the rod main body 11 and the flanges 26 in the axial direction of the mounting bracket 21, the magneto-elastic member 31 undergoes a shear deformation under an external force acting in the lengthwise direction of the torque rod 1. The magnetic particles are aligned in the axial direction of the bushing assembly 17 when the magnetic flux generated from the coil 32 passes through the magneto-elastic member 31 in the axial direction so that the magneto-elastic member 31 produces an internal stress that opposes the shear deformation thereof. Thus, the elastic modulus of the magneto-elastic member 31 can be increased and decreased as desired by controlling the electric current supplied to the coil 32.

Thus, according to this embodiment, the stiffness of the torque rod 1 can be controlled in dependence on the operating condition of the vehicle by adjusting the current of the coil 32. More specifically, when the vehicle handling (the driving stability or the like) is desired to be improved, it can be accomplished by increasing the stiffness of the torque rod 1. On the other hand, when the vibration transmitted from the engine 3 to the vehicle body 2 via the torque rod 1 is desired to be decreased, rather than the handling of the vehicle, it can be accomplished by decreasing the stiffness of the torque rod 1. Thereby, the vehicle handling and the vibration and noise performance can both be attained as desired.

Moreover, since the static spring characteristics, the dynamic spring characteristics, and the damping characteristics of the large diameter end portion 14 of the torque rod 1 can be changed, various advantages other than an improvement in the vehicle handling and the vibration and noise performance can be gained. For example, by changing the spring characteristics of the torque rod 1 when the driving torque is generated from the engine 3, the delay in the transmission of the driving torque from the engine 3 to the vehicle body 2 or to the wheels can be changed. As a result, the driver can obtain a favorable acceleration impression at the time of acceleration when the torque rod 1 is made stiffer. Further, the stiffness (spring characteristics) of the torque rod 1 may be controlled during braking, turning, and traveling on an irregular road surface. By thus controlling the influences of the motion and vibration of the engine 3 on the vehicle body 2, the driver is enabled to operate the vehicle in a comfortable manner. For instance, the stiffness (spring characteristic) of the torque rod 1 can be adjusted in dependence of the engine rotational speed. By thus controlling the rotational speed characteristics or the frequency characteristics of the torque rod 1, the cabin noise can be controlled in an optimum fashion.

Figure 5A:
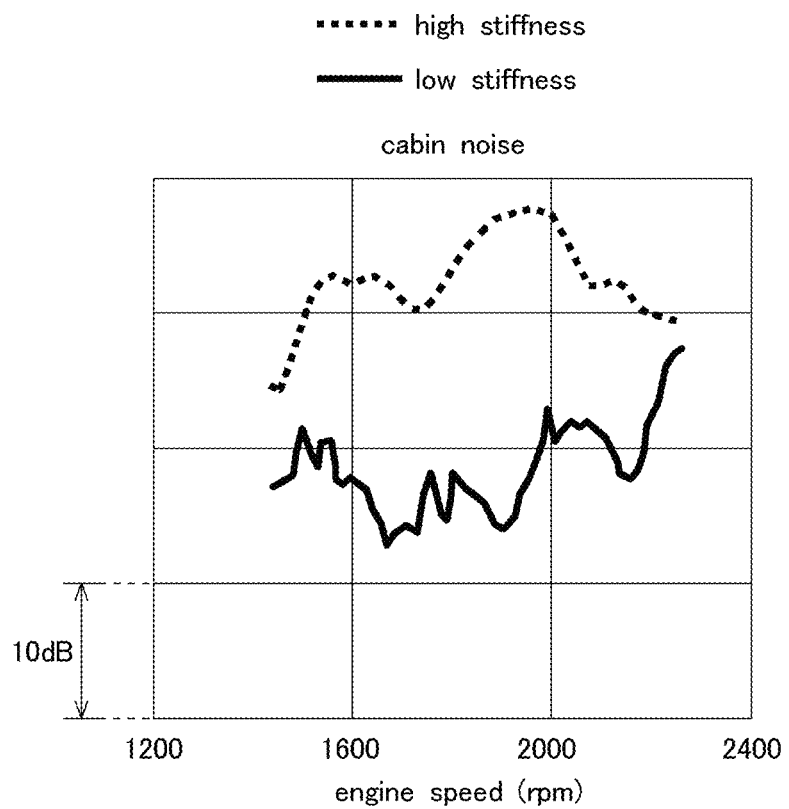
FIG. 5A is a graph showing the relationship between the cabin noise and the engine rotational speed when the magneto-elastic member is in a high stiffness condition and a low stiffness condition.
Figure 5B:
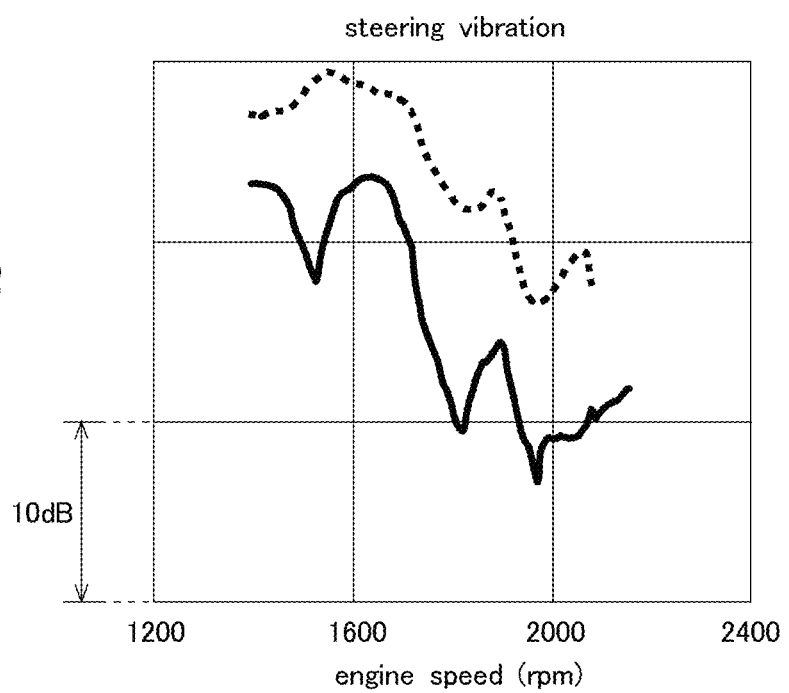
FIG. 5B is a graph showing the relationship between the steering vibration and the engine rotational speed when the magneto-elastic member is in a high stiffness condition and a low stiffness condition.

FIG. 5A is a graph showing the relationship between the cabin noise and the engine rotational speed in a solid line and a dotted line when the magneto-elastic member is in a high stiffness condition and a low stiffness condition, respectively. FIG. 5B is a graph showing the relationship between the steering vibration and the engine rotational speed in a solid line and a dotted line when the magneto-elastic member is in a high stiffness condition and a low stiffness condition, respectively.

As shown in FIG. 5A, the cabin noise level is lower when the magneto-elastic member 31 is low in stiffness than when the magneto-elastic member 31 is high in stiffness substantially over the entire engine rotational speed range. As shown in FIG. 5B, the steering wheel vibration level (first order vibration mode) is also lower when the magneto-elastic member 31 is low in stiffness than when the magneto-elastic member 31 is high in stiffness substantially over the entire engine rotational speed range.

Second Embodiment

Figure 6:
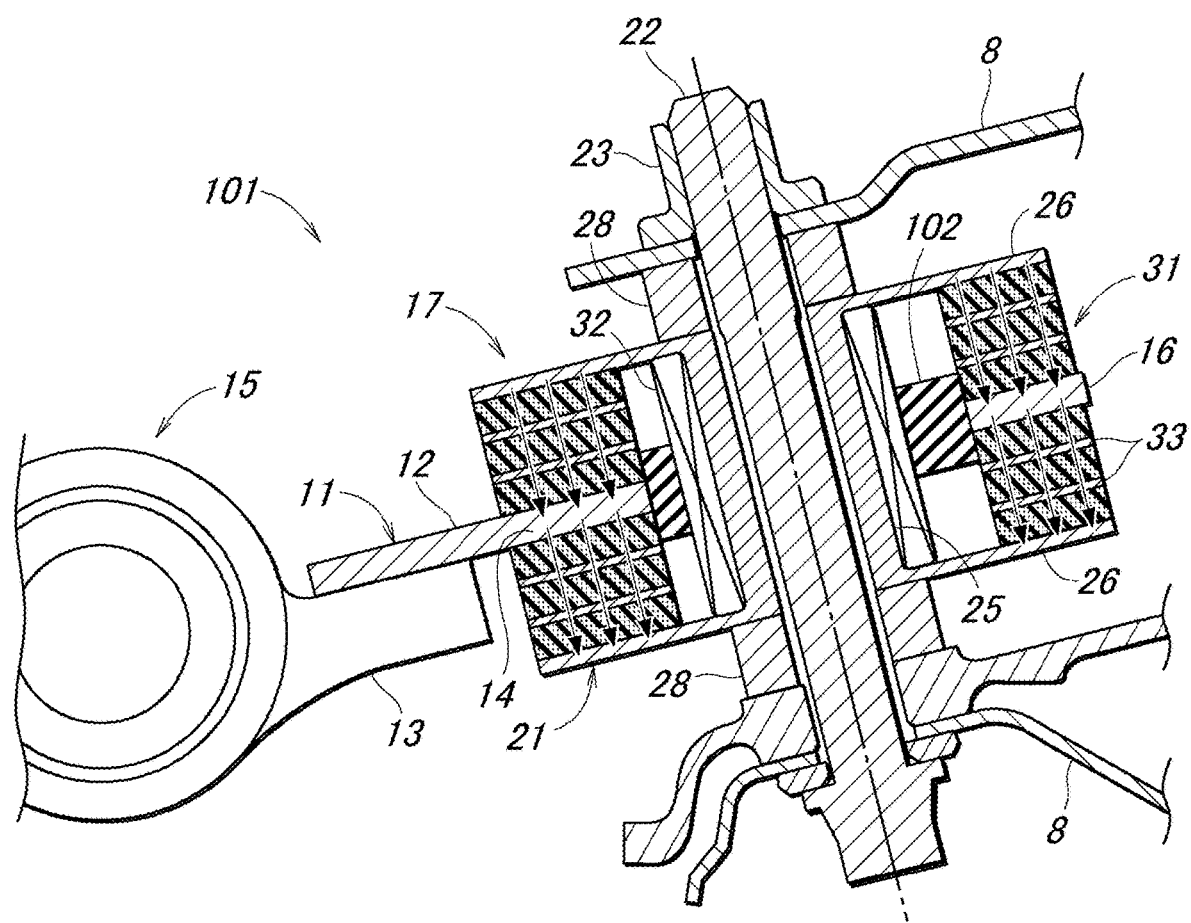
FIG. 6 is a sectional view of a torque rod according to a second embodiment of the present invention.

A torque rod 101 according to a second embodiment of the present invention is described in the following with reference to FIG. 6 which is a cross sectional view of the torque rod 101. In the following disclosure, the parts corresponding to those of the preceding embodiment are denoted with like numerals without necessarily repeating the description of such parts to avoid redundancy.

In the present embodiment, the torque rod 101 further includes a constant elastic modulus member 102 having an annular shape or a tubular shape, and radially interposed between the outer annular portion 16 of the vehicle body side rod body 12 and the inner cylindrical portion 25 of the bushing assembly 17. More specifically, the constant elastic modulus member 102 is interposed between the inner peripheral surface of the outer annular portion 16 of the vehicle body side rod body 12 and the outer peripheral surface of the coil 32 provided on the outer periphery of the inner cylindrical portion 25 of the bushing assembly 17. The axial ends of the constant elastic modulus member 102 are axially spaced from the opposing surfaces of the flanges 26. The constant elastic modulus member 102 is made of a polymer material such as natural rubber or urethane. The constant elastic modulus member 102 primarily receives a load acting in the lengthwise direction of the rod main body 11 (or in the radial direction of the mounting bracket 21) by undergoing an elastic compressive deformation.

In this embodiment, the constant elastic modulus member 102 is provided between the outer peripheral surface of the coil 32 and the inner peripheral surface of the outer annular portion 16, but the constant elastic modulus member 102 may also be provided between the outer peripheral surface of the inner cylindrical portion 25 and the inner peripheral surface of the outer annular portion 16 while the coil 32 is separated into two parts provided on parts of the outer peripheral surface of the inner cylindrical portion 25 located on either axial side of the constant elastic modulus member 102.

Third Embodiment

Figure 7A:
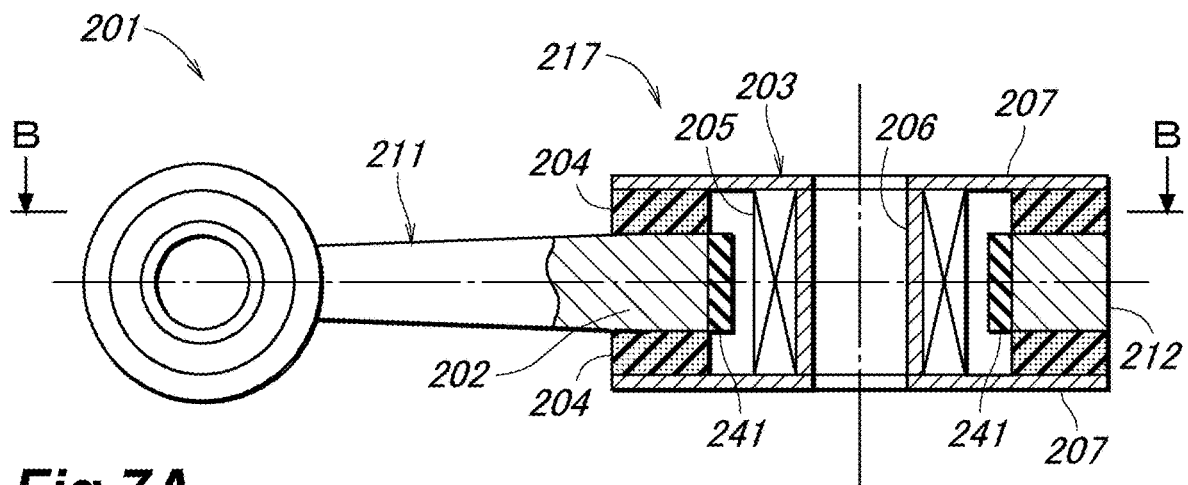
FIG. 7A is a sectional view of a torque rod according to a third embodiment of the present invention taken along a plane containing the lengthwise axis of the torque rod and the axis of a mounting bracket.
Figure 7B:
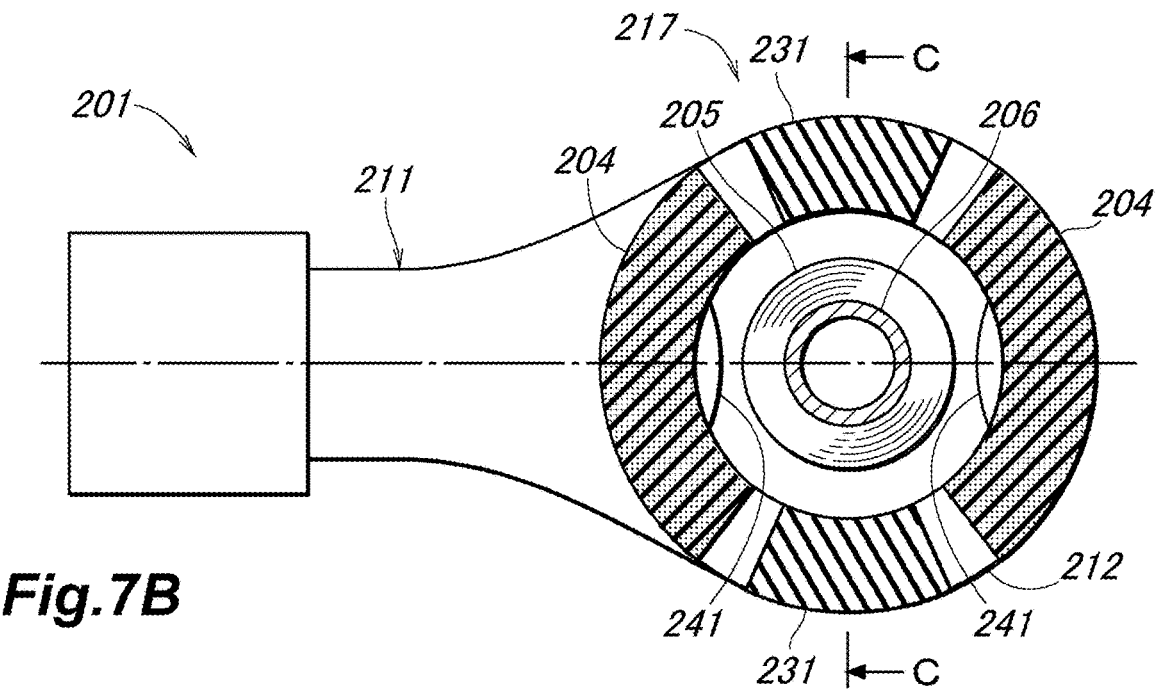
FIG. 7B is a sectional view taken along line B-B in FIG. 7A.
Figure 7C:
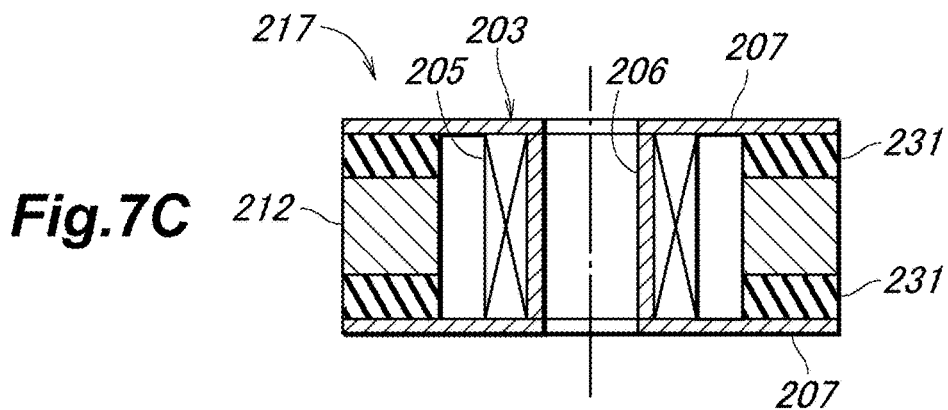
FIG. 7C is a sectional view taken along line C-C in FIG. 7B.

A torque rod 201 according to a second embodiment of the present invention is described in the following with reference to FIGS. 7A to 7C. FIG. 7A is a sectional view of the torque rod 201 taken along a plane containing the lengthwise axis of the torque rod 201 and the axis of a mounting bracket, FIG. 7B is a sectional view taken along line B-B in FIG. 7A, and FIG. 7C is a sectional view taken along line C-C in FIG. 7B. In the following disclosure, the parts corresponding to those of the preceding embodiments are denoted with like numerals without necessarily repeating the description of such parts to avoid redundancy.

In this embodiment, as shown in FIG. 7A, the torque rod 201 is provided with a large diameter end portion 202 connected to the vehicle body via a bushing assembly 217. The bushing assembly 217 includes a mounting bracket 203, a magneto-elastic member 204 and a coil 205.

The mounting bracket 203 includes an inner cylindrical portion 206 through which a bolt (not shown in the drawings) is passed, and a pair of flanges 207 attached to the respective axial ends of the inner cylindrical portion 206.

The magneto-elastic member 204 is axially interposed between the flanges 207 of the mounting bracket 203 and an outer annular portion 212 or the large diameter end portion 202 of the rod main body 211.

The coil 205 is provided on the outer periphery of the inner cylindrical portion 206 of the mounting bracket 203.

Further, as shown in FIG. 7B, a constant elastic modulus member 231 is provided at the large diameter end portion 202 of the torque rod 201. The constant elastic modulus member 231 consists of four separate pieces (a pair on one side of the outer annular portion 212 of the rod main body 211, and another pair on the other side of the outer annular portion 212 of the rod main body 211) each having a fan shape in plan view, and is axially interposed between the corresponding axial end surface of the outer annular portion 212 of the rod main body 211 and the opposing surface of the corresponding flange 207. The two pieces of the constant elastic modulus member 231 on each side of the outer annular portion 212 of the rod main body 211 are arranged symmetric to each other with respect to the lengthwise axis of the rod main body 211, and concentric to the axis of the mounting bracket 203.

As shown in FIG. 7B, the magneto-elastic member 204 consists of four separate pieces (a pair on one side of the outer annular portion 212 of the rod main body 211, and another pair on the other side of the outer annular portion 212 of the rod main body 211) each having a fan shape in plan view, and is axially interposed between the corresponding axial end surface of the outer annular portion 212 of the rod main body 211 and the opposing surface of the corresponding flange 207. The two pieces of the magneto-elastic member 204 on each side of the outer annular portion 212 of the rod main body 211 are arranged symmetric to each other with respect to an axis orthogonal to both the lengthwise axis of the rod main body 211 and the axis of the mounting bracket 203, and concentric to the axis of the mounting bracket 203. In the illustrated embodiment, each piece of the constant elastic modulus member 231 extends over a smaller sector angle than each piece of the magneto-elastic member 204 in plan view, and a gap is defined between each piece of the magneto-elastic member 204 and the adjoining piece of the constant elastic modulus member 231 along the circumferential direction.

As shown in FIGS. 7A and 7B, a stopper 241 is provided centrally on the inner peripheral surface of each piece of the magneto-elastic member 204. The stopper 241 is made of elastomer material such as natural rubber. A certain gap is defined between each stopper 241 and the opposing surface of the coil 205 which is wound around the inner cylindrical portion 206 of the mounting bracket 203.

According to this arrangement, the magneto-elastic member 204 and the constant elastic modulus member 231 undergo shear deformation when subjected to an external force in the lengthwise direction of the rod main body 211. When the relative displacement between the rod main body 211 and the mounting bracket 203 is small, the elastic force acting between the rod main body 211 and the mounting bracket 203 is linear in relation to the magnitude of the external force, and the torque rod 201 exhibits a low stiffness. On the other hand, when the relative displacement between the rod main body 211 and the mounting bracket 203 increases to such an extent that the coil 205 hits the stoppers 241, the stoppers 241 undergo compressive deformation in response so that the torque rod 201 exhibits a higher stiffness. As a result, the elastic force generated between the rod main body 211 and the mounting bracket 203 is nonlinear in relation to the relative displacement between the rod main body 211 and the mounting bracket 203 in such a manner that the torque rod 201 exhibits a high stiffness in effect.

Fourth Embodiment

Figure 8A:
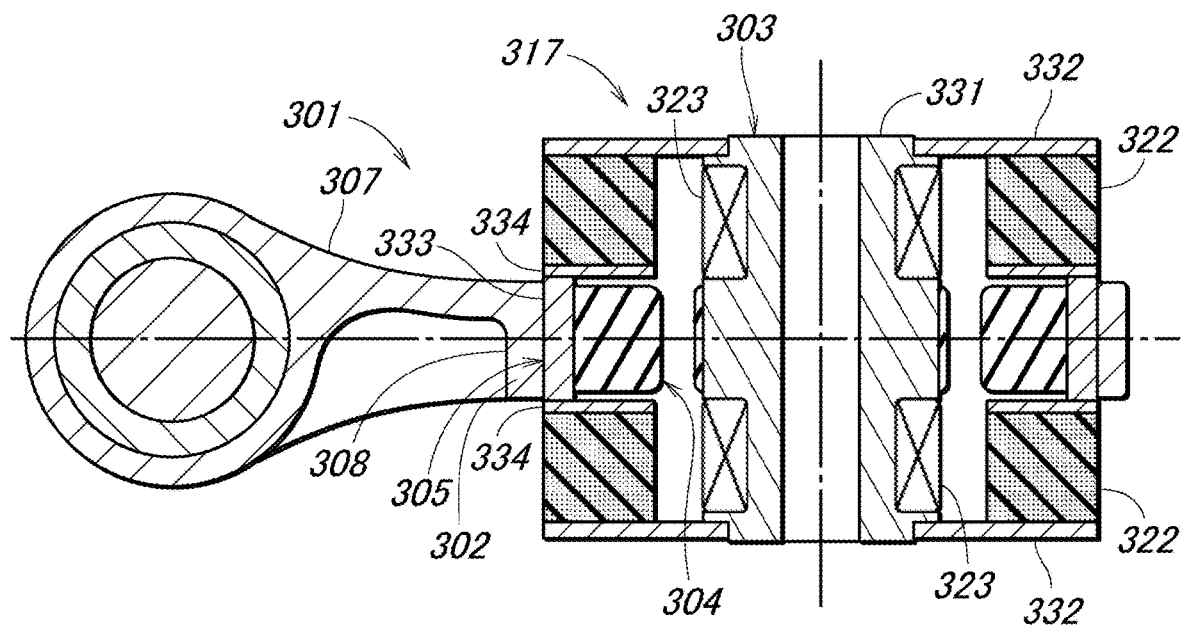
FIG. 8A is a sectional view of a torque rod according to a fourth embodiment of the present invention taken along a plane containing the lengthwise axis of the torque rod and the axis of a mounting bracket.
Figure 8B:
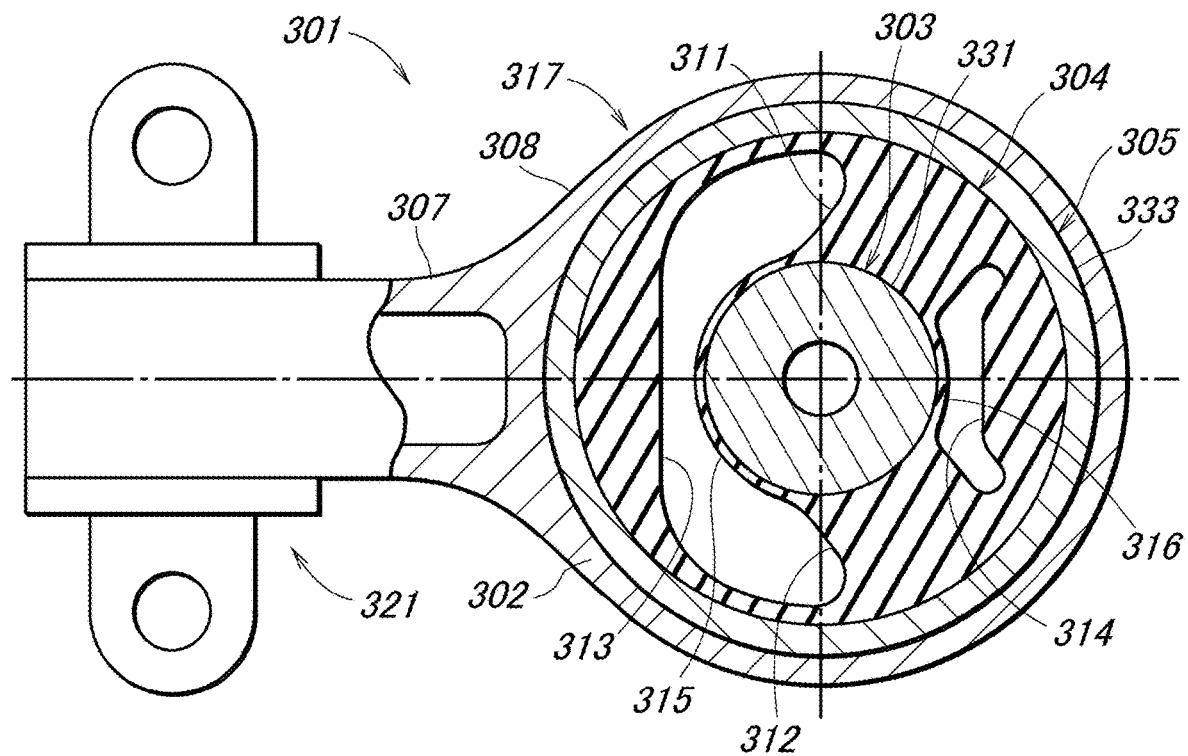
FIG. 8B is a sectional view taken along a plane orthogonal to the axis of the mounting bracket.

A torque rod 301 according to a fourth embodiment of the present invention is described in the following with reference to FIGS. 8A and 8B. FIG. 8A is a sectional view of the torque rod 301 taken along a plane containing the lengthwise axis of the torque rod and the axis of a mounting bracket, and FIG. 8B is a sectional view taken along a plane orthogonal to the axis of the mounting bracket. In the following disclosure, the parts corresponding to those of the preceding embodiments are denoted with like numerals without necessarily repeating the description of such parts to avoid redundancy.

In this embodiment, as shown in FIG. 8A, the torque rod 301 includes a rod main body 307, and a large diameter end 302. The large diameter end 302 of the torque rod 301 is connected to the vehicle body via a bushing assembly 317 which includes a mounting bracket 303, a constant elastic modulus member 304, and an insert member 305 fixedly fitted into an opening in the large diameter end 302 of the torque rod 301.

The mounting bracket 303 has an inner cylindrical portion 331 through which a bolt (not shown) is passed for connection to the vehicle body, and a pair of flanges 332 provided at either axial end of the inner cylindrical portion 331. The mounting bracket 303 is formed of a high magnetic permeability material such as iron-based material.

The insert member 305 includes an outer cylindrical portion 333 fitted inside the large diameter end 302 or an outer annular portion 308 of the torque rod 301, and a pair of flanges 334 projecting radially inward from the respective axial ends of the outer cylindrical portion 333. The insert member 305 is made of a high magnetic permeability material such as iron-based material.

As shown in FIG. 8B, the constant elastic modulus member 304 is radially interposed between the outer cylindrical portion 333 of the insert member 305 and the inner cylindrical portion 331 of the mounting bracket 303.

The constant elastic modulus member 304 is attached to the outer circumferential surface of the inner cylindrical portion 331 and the inner circumferential surface of the insert member 305. The constant elastic modulus member 304 may be considered as a disk member made of polymer material and formed with a pair of openings passed through the entire axial length thereof and elongated in a direction orthogonal to the lengthwise direction of the torque rod 301 so that the inner peripheral part and the outer peripheral part of the constant elastic modulus member 304 are connected to the outer cylindrical portion 333 of the insert member 305 and the inner cylindrical portion 331 of the mounting bracket 303, respectively, solely by a pair of leg portions 311 and 312 extending obliquely between the inner peripheral part and the outer peripheral part of the constant elastic modulus member 304. The leg portions 311 and 312 are provided symmetric to each other about the lengthwise axis of the rod main body 307, and extend away from the rod main body 307 at an angle to this lengthwise axis.

The openings in the constant elastic modulus member 304 create a pair of gaps between the inner peripheral part and the outer peripheral part of the constant elastic modulus member 304 with respect to the lengthwise axis of the rod main body 307 so that a pair of stoppers 313 and 314 on the outer peripheral part of the constant elastic modulus member 304 oppose corresponding opposing parts 315 and 316 on the inner peripheral part of the constant elastic modulus member 304 along the lengthwise axis of the rod main body 307.

Thus, when the relative displacement between the rod main body 307 and the mounting bracket 303 increases beyond a certain limit, the opposing parts 315 and 316 abut against the corresponding stoppers 313 and 314. Therefore, when the relative displacement between the rod main body 307 and the mounting bracket 303 is small, the stiffness of the torque rod 301 is low because the stiffness is determined by the elastic deformation of the leg portions 311 and 312. When the relative displacement between the rod main body 307 and the mounting bracket 303 is large, the stiffness of the torque rod 301 is high because the stiffness is determined by the elastic deformation of the stoppers 313 and 314 and the opposing parts 315 and 316 that abut against each other, respectively.

In this embodiment, as shown in FIG. 8A, the torque rod 301 includes a magneto-elastic member 322 and a coil 323.

The magneto-elastic member 322 consists of two pieces each having an annular shape, and axially interposed between the corresponding flange 332 of the mounting bracket 303 and the opposing flange 334 of the insert member 305. An outer peripheral part of the constant elastic modulus member 304 is placed between the flanges 334 of the insert member 305. Thus, the constant elastic modulus member 304 is positioned axially between the two pieces of the magneto-elastic member 322.

The coil 323 is wound around the inner cylindrical portion 331 of the mounting bracket 303, and consists of two parts that are axially separated from each other. The magnetic flux generated from the coil 323 is guided to the flanges 332 of the mounting bracket 303 and the flanges 334 of the insert member 305 to be passed through the magneto-elastic member 322.

The present invention has been described in terms of specific embodiments, but is not limited by such embodiments, and can be modified in various ways without departing from the scope of the present invention. For instance, alternatively or additionally, the bushing assembly can be provided between the engine and the corresponding end of the torque rod.

The invention claimed is:

1. A torque rod configured to be connected between a vehicle body and an engine to restrict a movement of the engine relative to the vehicle body, comprising:
    a rod main body; and
    a bushing assembly provided at one end of the rod main body;
    wherein the bushing assembly includes a mounting bracket configured to be mounted to the vehicle body or the engine via a bolt passed therethrough in an axial direction, a magneto-elastic member made of magneto-elastic material axially interposed between the one end of the rod main body and the mounting bracket, and a coil configured to apply a magnetic flux to the magneto-elastic member,
    wherein the mounting bracket includes an inner tubular member having the bolt passed axially therethrough, and a pair of flanges provided at either axial end of the inner tubular member, and the one end of the rod main body is provided with an outer annular portion having the bolt passed axially therethrough, the magneto-elastic member being axially interposed between the outer annular portion and the respective flanges,
    wherein the magneto-elastic member includes a plurality of layers of the magneto-elastic material, and annular disks made of high magnetic permeability material interleaved between the layers of the magneto-elastic material, and
    wherein the magnetic flux generated from the coil passes through the magneto-elastic member in the axial direction so that the magneto-elastic member undergoes a shear deformation under an external force acting in the axial direction of the torque rod.

2. The torque rod according to claim 1, wherein the inner tubular member, the flanges and the outer annular portion are made of high magnetic permeability material, and the coil is wound around the inner tubular member.

3. The torque rod according to claim 1, wherein the magneto-elastic member has a hollow cylindrical shape and is configured to change an elastic property with respect to a shear deformation thereof in a transverse direction in dependence on a magnetic flux passing axially through the magneto-elastic member.

4. The torque rod according to claim 1, wherein the magneto-elastic material is essentially made of magneto-elastic elastomer.

5. The torque rod according to claim 1, further comprising a constant elastic modulus member radially interposed between the outer annular portion and the inner tubular member.

6. The torque rod according to claim 1, further comprising a constant elastic modulus member radially interposed between the outer annular portion and the coil.

7. The torque rod according to claim 1, further comprising a pair of constant elastic modulus members axially interposed between the outer annular portion and the respective flanges of the mounting bracket, and arranged on either side of a lengthwise axial center line of the rod main body, and the magneto-elastic member comprises a pair of magneto-elastic members positioned along the lengthwise axial center line of the rod main body so as to circumferentially alternate with the constant elastic modulus members.

8. The torque rod according to claim 1, further comprising a constant elastic modulus member radially interposed between the outer annular portion and the inner tubular member, and the magneto-elastic member includes a pair of magneto-elastic members each interposed between a corresponding one of an axial end surface of the outer annular portion and an opposing axial end surface of the corresponding flange of the mounting bracket.

* * * * *